(12) United States Patent
Herzog et al.

(10) Patent No.: US 12,089,016 B2
(45) Date of Patent: Sep. 10, 2024

(54) ACOUSTIC FEEDBACK CONTROL METHOD WITH ADAPTIVE FILTERING

(71) Applicant: ARTEAC-LAB, Marseilles (FR)

(72) Inventors: Philippe Herzog, Roquevaire (FR); Christophe Lambourg, Marseilles (FR)

(73) Assignee: ARTEAC-LAB, Marseilles (FR)

( * ) Notice: Subject to any disclaimer, the term of this patent is extended or adjusted under 35 U.S.C. 154(b) by 46 days.

(21) Appl. No.: 17/995,154

(22) PCT Filed: Mar. 24, 2021

(86) PCT No.: PCT/FR2021/050502
§ 371 (c)(1),
(2) Date: Sep. 30, 2022

(87) PCT Pub. No.: WO2021/198587
PCT Pub. Date: Oct. 7, 2021

(65) Prior Publication Data
US 2023/0224637 A1    Jul. 13, 2023

(30) Foreign Application Priority Data
Apr. 1, 2020   (FR) ...................... 20/03234

(51) Int. Cl.
*H04R 3/02*   (2006.01)
*G06F 3/16*   (2006.01)
(Continued)

(52) U.S. Cl.
CPC ............... *H04R 3/02* (2013.01); *G06F 3/167* (2013.01); *G10K 15/08* (2013.01); *H04R 29/004* (2013.01)

(58) Field of Classification Search
CPC ......... H04R 3/02; H04R 29/004; G06F 3/167; G10K 15/08; H04M 9/082; H04M 9/08
(Continued)

(56) References Cited

U.S. PATENT DOCUMENTS

2013/0070936 A1* 3/2013 Jensen ..................... H04R 3/02
381/71.11

OTHER PUBLICATIONS

Frank Wefers, Partitioned convolution algorithms for real-time auralization (Year: 2014).*
(Continued)

*Primary Examiner* — Norman Yu
(74) *Attorney, Agent, or Firm* — CANTOR COLBURN LLP (57) ABSTRACT

An acoustic feedback control adaptive method, the input signal being a function of a captured signal and an estimation of an acoustic feedback, the method including the following steps: —determining an impulse response (RI) of a filter (A) according to a partition of time blocks ($b_0, \ldots b_i, \ldots, b_{Nb}$), according to the following steps of: —for each sub-block ($h_{1,i}, h_{2,i}, \ldots h_{j,i}, \ldots h_{Ni,i}$) of each block of the impulse response (RI), calculating a frequency transform ($F_{1,i}, F_{2,i}, \ldots F_{j,i}, \ldots F_{Ni,i}$); —repeating the following steps of: —applying the filter (A) to the output signal (u) using the frequency transform ($F_{1,i}, F_{2,i}, \ldots F_{j,i}, \ldots F_{Ni,i}$) of each sub-block ($h_{1,i}, h_{2,i}, \ldots h_{j,i}, \ldots h_{Ni,i}$); —updating the frequency transform ($F_{1,i}, F_{2,i}, \ldots F_{j,i}, \ldots F_{Ni,i}$) of each sub-block ($h_{1,i}, h_{2,i}, \ldots h_{j,i}, \ldots h_{Ni,i}$) as a function of the output signal and the input signal based on the same partition as that used in the step of applying the filter (A).

10 Claims, 4 Drawing Sheets

(51) Int. Cl.
*G10K 15/08* (2006.01)
*H04R 29/00* (2006.01)

(58) Field of Classification Search
USPC ............. 381/93, 83, 318, 71.1, 94.1, 317; 379/406.01
See application file for complete search history.

(56) References Cited

OTHER PUBLICATIONS

Frank Wefers, "Partitioned convolution algorithms for real-time auralization"; May 13, 2015; pp. 1-269; URL:http://publications.rwth-aachen.de/record/466561/files/466561.pdf?subformat=pdfa; XP055566796.

International Search Report issued Aug. 5, 2021 re: Application No. PCT/FR2021/050502; p. 1, citing: Wefers, 'Partitioned convolution algorithms.

* cited by examiner

ACOUSTIC FEEDBACK CONTROL METHOD WITH ADAPTIVE FILTERING

TECHNICAL FIELD

The present disclosure concerns the field of signal processing for the cancellation of an echo associated with an acoustic signal, and in particular for resisting the Larsen effect in the sound broadcasting systems.

BACKGROUND

It is known to model a transfer function between an output signal u of a sound broadcasting device and an acoustic feedback signal x, generated by the environment from the output signal u, to estimate a contribution $\hat{x}$ of said acoustic feedback signal x to a signal y captured by a microphone; this estimation makes it possible to deduce therefrom by difference between y and $\hat{x}$ an estimation of the source signal s, purified from the acoustic feedback signal x generated by the echo(s).

It is known in particular to model the transfer function with an adaptive filter, whose finite impulse response is time-partitioned in a non-uniform manner.

The known methods, based on the use of an adaptive filter whose impulse response is time-partitioned in a non-uniform manner, require to explicitly calculate the impulse response in the time domain, which increases the algorithmic complexity.

SUMMARY

The disclosure therefore suggests a solution to all or part of these problems.

To this end, the present disclosure concerns an acoustic feedback control adaptive method in an output signal of a sound broadcasting device, the sound broadcasting device receiving as input an input signal, the input signal being a function of a signal captured by a microphone and an estimation of an acoustic feedback signal, the captured signal being equal to the sum of an acoustic source signal and the acoustic feedback signal, the estimation of the acoustic feedback signal comprising the following steps of:
  determining a filter, an impulse response of the filter being partitioned into a partition comprising a plurality of blocks in the time domain, each block of the plurality comprising a number of samples of the impulse response, said number of samples being equal to a size of said block, each block of the plurality of blocks comprising a number of sub-blocks, the number of sub-blocks being greater than or equal to one, the determination step further comprising the following steps of:
  for each sub-block of each block of the impulse response, calculating a frequency transform from said sub-block;
  repeat the following steps of:
  applying the filter to the output signal using the frequency transform of each sub-block of each block of the impulse response, to obtain the estimation of the acoustic feedback signal;
  adapting the filter, by updating the frequency transform of each sub-block of each block of the impulse response as a function of the output signal and the input signal, characterized in that:
  the filter adaptation is carried out by an update of the frequency transform calculated and adapted based on the same partition as that determined in the determination step, and used in the filter application step.

According to these arrangements, the filter adaptation step uses the same partition of the impulse response as that determined in the determination step and used in the filter application step, which allows avoiding having to perform the creation and calculation steps at each iteration of the method.

According to one implementation, the disclosure comprises one or more of the following features, alone or in a technically acceptable combination.

According to one implementation, the size of a block is different from another size of at least one other block.

According to one implementation, the frequency transform is a Fourier transform.

According to one implementation, each sub-block of said block has the same size as the other sub-blocks of said block.

According to one implementation, the calculation of the frequency transform of a sub-block of a block of the impulse response comprises the following steps of:
  creating a concatenated sub-block by concatenating said sub-block with virtual samples, so that a size of the concatenated sub-block is equal to at least twice the size of said sub-block;
  calculating the frequency transform of the concatenated sub-block created for said sub-block;

According to one implementation, the value of at least one virtual sample is comprised between −0.5 and 0.5, preferably equal to 0; preferably the value of all the virtual samples is equal to 0.

According to one implementation, the virtual samples are placed before the samples of the sub-block to create the concatenated sub-block.

According to one implementation, the function of the captured signal and of the estimation of the acoustic feedback signal is equal to a difference between the captured signal and the estimation of the acoustic feedback signal.

According to one implementation, the output signal, the input signal, respectively comprise a plurality of samples, in the time domain, each sample of said plurality of samples corresponding to one value, at successive instants, of the output signal, respectively of the input signal, and the determination step further comprises the following steps of:
  creating a plurality of components, the plurality of components comprising a non-delayed component associated with a non-delayed block of the partition, and at least one delayed component, the non-delayed component comprising a non-delayed output buffer, the at least one delayed component comprising a delayed output buffer;
  creating a plurality of source buffers, each source buffer being associated with a block of the partition;
  and the adaptation step comprises the following steps of:
  calculating a frequency transform of the contents of the output buffer;
  inserting the frequency transform into a ring buffer configured to contain a history of the Fourier transforms calculated during the last iterations, for a number of iterations determined according to the number of sub-blocks of the block associated with the component;
  for each source buffer of the plurality of source buffers, calculating a frequency transform from said source buffer;
  updating the frequency transform of each sub-block of each block of the impulse response from the ring buffer and from the frequency transform calculated from the source buffers.

According to one implementation, each component is respectively configured to receive in said output buffer a number of samples of the output buffer, said number of samples of the output buffer being equal to twice the size of a sub-block of the block associated with said component.

According to one implementation, each source buffer of the plurality of source buffers has a size equal to the size of a sub-block of the block associated with said source buffer.

According to one implementation, the non-delayed component comprises a first non-delayed buffer and a second non-delayed buffer, the at least one delayed component comprising a first delayed buffer, and a second delayed buffer, and the method comprises the following steps of
creating a plurality of FIFO buffers, each FIFO buffer being associated with a block of the partition, and having a depth equal to the size of said block of the partition, the depth defining a number of samples of the output signal that may be backed up in said FIFO buffer, the at least one delayed component being associated with a FIFO buffer and with the block of the partition associated with said FIFO buffer; and the adaptation step comprises the following steps of:
at each instant, backing up the corresponding sample of the output signal in the first non-delayed buffer of the non-delayed component, until the first non-delayed buffer is full;
in each FIFO buffer of the first plurality of FIFO buffers, and for each instant, backing up the samples of the output signal, until said buffer is full, with at least one last sample backed up in said buffer and the delayed sample backed up first in said buffer;
for each delayed component of the plurality of components, at each instant following the instant when the FIFO buffer associated with said delayed component is full, backing up the delayed sample of said FIFO buffer in the first delayed buffer of said delayed component, until said first delayed buffer is full;
for each component of the plurality of components:
when the first buffer is full, if the second buffer of said component is empty, copying said first buffer in the second buffer of said component, and iterating until the first one is full again;
if the second buffer of said component is not empty, forming the output buffer by concatenating the first and second buffers of said component;

According to one implementation, the first buffer and the second buffer of each component are respectively configured to receive a number of samples of the buffer, said number of samples of the buffer being equal to the size of a sub-block of the block associated with said component.

According to one implementation, the adaptation step comprises the following steps of:
for each source buffer of the plurality of source buffers, at each instant, backing up the corresponding sample of the input signal in said source buffer, until said source buffer is full;
for each source buffer of the plurality of source buffers, creating a concatenated source buffer by concatenating said source buffer with virtual source samples having the same virtual source sample value, such that a size of the concatenated source buffer is equal to at least twice the size of said source buffer;
and the calculation of a Fourier transform from said source buffer is carried out from the concatenated source buffer created for each source buffer of the plurality of source buffers;

According to one implementation, the value of at least one virtual source sample is comprised between −0.5 and 0.5, preferably equal to 0; preferably the value of all the virtual source samples is equal to 0.

According to one implementation, the concatenated source buffer is created by adding the virtual source samples before the samples of the source buffer so as to obtain the concatenated source buffer.

According to one implementation, the step of updating the frequency transform of each sub-block of each block of the impulse response from the first ring buffer and the second ring buffer, is carried out by applying an adaptive method in the frequency domain.

According to one implementation, the adaptive method in the frequency domain is performed by an algorithm, known by those skilled in the art as Fast Block LMS.

According to one implementation, other more advanced adaptive algorithms can be applied.

According to these arrangements, consisting in using different block sizes, common to the convolution and the adaptation, adaptation parameter sets must be chosen, including in particular a pitch coefficient, these parameters being specific to each size of the sub-blocks, while ensuring the consistency of the estimation.

Several steps can be followed in choosing these parameter sets, it is possible to obtain a different convergence speed at the beginning and the end of the response, which can be favourable in practice.

According to another aspect, the disclosure concerns a computer program comprising a set of instructions executable by a computer processor, the set of instructions being configured to implement the steps of the method according to any one of the preceding claims when the set of instructions is executed by the computer processor.

According to yet another aspect, the disclosure concerns a computer-readable medium, comprising a set of instructions executable by a computer processor, the set of instructions being configured to implement the steps of the method according to any one of the implementations previously described, when the set of instructions is executed by the computer processor.

BRIEF DESCRIPTION OF THE DRAWINGS

For a better understanding thereof, an embodiment and/or an implementation of the disclosure is described with reference to the attached drawings representing, by way of non-limiting example, an embodiment or an implementation respectively of a device and/or a method according to the disclosure. The same references in the drawings refer to similar elements or elements whose functions are similar.

DETAILED DESCRIPTION OF THE DRAWINGS

An acoustic feedback control system is often also called AFC system according to the Anglo-Saxon terminology referring to an Acoustic Feedback Cancellation or anti-feedback system. The general principle of an AFC system is shown in FIG. 1.

Hereinafter, s(n) refers to the value of the signal s at the instant t=nΔt, Δt being the sampling period common to all the signals. Thus, in FIG. 1, u(n) refers to the output signal of a sound broadcasting system S. y(n) is the signal captured by the microphone, equal to the sum of the non-measurable signal emitted by the source s(n), and of the acoustic feedback x(n). The principle of the AFC is to model the transfer function $\hat{F}$ of the acoustic feedback whose input is u(n) and output is x(n) using a filter A, of the FIR type i.e. finite impulse response filter. This filter is applied to the signal u(n) to obtain an estimation $\widehat{x(n)}$ of x(n), which is subtracted from y(n). The resulting signal e(n) output from the AFC algorithm is an estimation of the direct contribution of the source s(n).

The system according to the disclosure further comprises an adapter B configured to update in real-time the estimation of the transfer function $\hat{F}$ of the acoustic feedback from the signals u(n) and e(n), and to transmit it to A.

Figure 1:
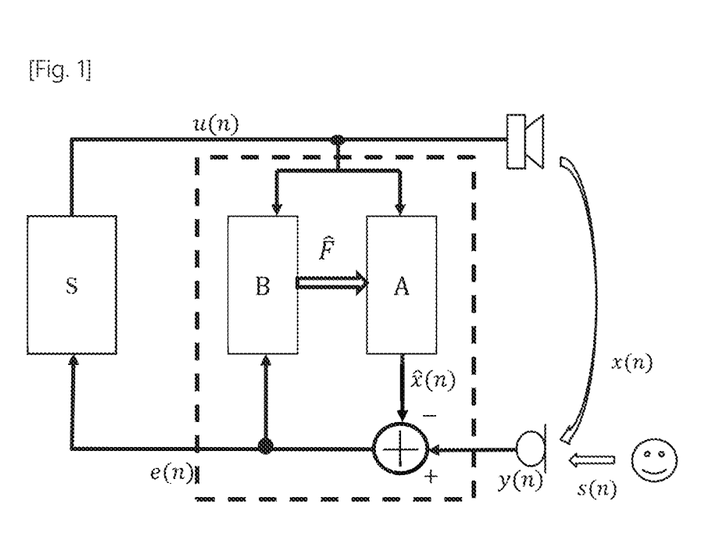
FIG. 1 is a schematic representation of the components of a device configured to implement the method according to the disclosure.

FIG. 1 shows an example of implementation of the system for echo cancellation in the context of full-duplex communication. Those skilled in the art should understand that this example is not limiting and that other embodiments of the acoustic feedback control system according to the disclosure are possible.

Figure 2:
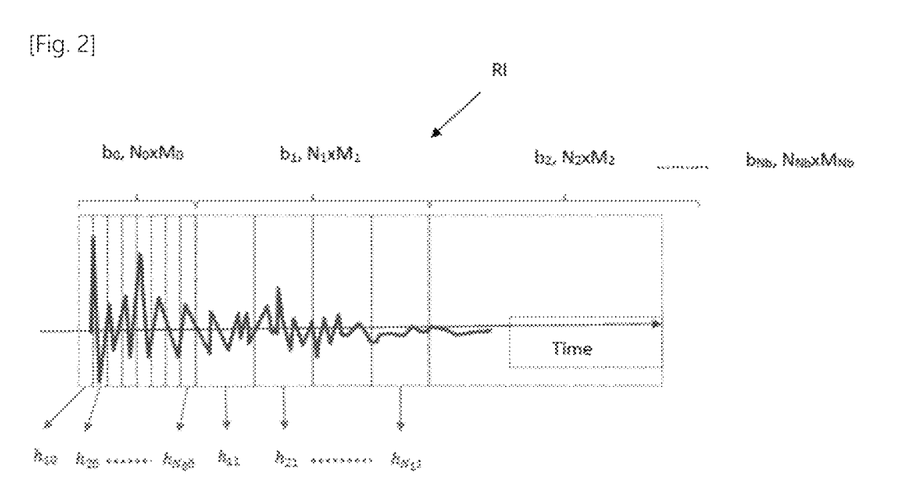
FIG. 2 is a representation of a partitioning mode of an impulse response of a filter used in the implementation of the method according to the disclosure.

The algorithm is based on a partitioning of the impulse response RI, a partitioning which is schematically represented in FIG. 2, and which will now be described with reference to FIG. 2. FIG. 2 shows in ordinates the different values of an impulse response of a model of the transfer function of the acoustic feedback as a function of the time represented in abscissas.

The impulse response is divided along the time axis into main blocks $b_0, \ldots b_i, \ldots, b_{Nb}$ of variable sizes $N_0*M_0, N_1*M_1, \ldots, N_i*M_i, \ldots, N_{Nb}*M_{Nb}$.

Each main block of index i is divided in turn into $N_i$ blocks of the same size $M_i$.

$h_{ji}$ refers to the impulse response portion corresponding to the jth block of the ith size $M_i$.

For each portion $h_{ji}$ of RI with a size $M_i$, said portion is concatenated with $M_i$ zeros, so that the size of the concatenated portion is 2Mi; then a Fourier transform $F_{ji}$ of the concatenated portion is calculated.

Hereinafter, $F_i$ refers to the array of dimension $N_i \times 2M_i$ which contains the Fourier transforms $F_{1i}, F_{2i}, \ldots, F_{Ni}$ calculated for each of the concatenated portions of the block $b_i$.

The encoding of the impulse response RI described above must necessarily be performed before a low-latency fast convolution algorithm can be applied, as described in the literature. It must therefore be applied each time the impulse response RI is modified.

The disclosure with which the claim is concerned consists of an adaptive method which allows directly updating the blocks $F_{ji}$, thus avoiding having to perform the above-described encoding steps at each update, as would be required by a conventional algorithm.

Figure 4:
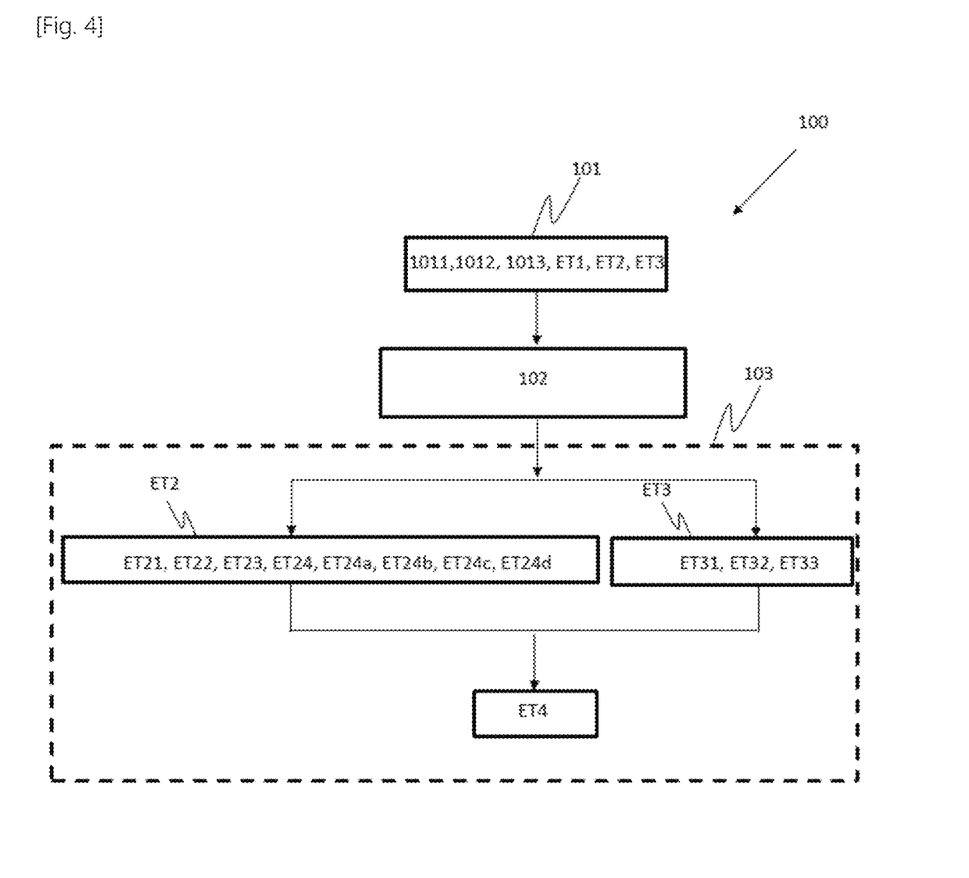
FIG. 4 is a simplified representation of a flowchart of the steps of the method according to one implementation of the disclosure.

In other words, according to one implementation and with reference to FIG. 4, the method 100 comprises the estimation $\hat{x}$ of the acoustic feedback signal x, which comprises the following steps of:
  determining 101 a filter A, an impulse response RI of the filter A being partitioned 1011 into a partition comprising a plurality of blocks $b_0, \ldots b_i, \ldots, b_{Nb}$ in the time domain, each block $b_0, \ldots, b_i, \ldots, b_{Nb}$ of the plurality comprising a variable number of samples of the impulse response, equal to a size of said block; each block of the plurality of blocks bi comprises a number Ni, greater than or equal to 1, of sub-blocks $h_{1,i}, h_{2,i}, \ldots h_{j,i}, \ldots h_{Ni,i}$, each sub-block $h_{1,i}, h_{2,i}, \ldots h_{j,i}, \ldots h_{Ni,i}$ of said block having the same size Mi as the other sub-blocks of said block, so that the size of a block bi is equal to Ni*Mi; the determination step 101 further comprising the following steps of:
  for each sub-block $h_{1,i}, h_{2,i}, \ldots h_{j,i}, \ldots h_{Ni,i}$ of each block, creating 1012 a concatenated sub-block by concatenating said sub-block $h_{1,i}, h_{2,i}, \ldots h_{j,i}, \ldots h_{Ni,i}$ with virtual samples, so that a size of the concatenated sub-block is equal to twice the size of said sub-block; preferably, the value of at least one virtual sample is comprised between −0.5 and 0.5, preferably equal to 0; preferably the value of all the virtual samples is equal to 0;
  for each sub-block $h_{1,i}, h_{2,i}, \ldots h_{j,i}, \ldots h_{Ni,i}$ of each block, calculating 1013 a Fourier transform $F_{1,i}, F_{2,i}, \ldots F_{j,i}, \ldots F_{Ni,i}$ of the concatenated sub-block created for said sub-block $h_{1,i}, h_{2,i}, \ldots h_{j,i}, \ldots h_{Ni,i}$;
repeating the following steps of:
  applying 102 the filter A to the output signal u using the Fourier transform $F_{1,i}, F_{2,i}, \ldots F_{j,i}, \ldots F_{Ni,i}$ of each sub-block $h_{1,i}, h_{2,i}, \ldots h_{j,i}, \ldots h_{Ni,i}$ of each block of the impulse response RI, to obtain the estimation $\hat{x}$ of the acoustic feedback signal x;
  adapting 103 the filter A, by updating the Fourier transform $F_{1,i}, F_{2,i}, \ldots F_{j,i}, \ldots F_{Ni,i}$ of each sub-block $h_{1,i}, h_{2,i}, \ldots h_{j,i}, \ldots h_{Ni,i}$ of each block of the impulse response RI as a function of the output signal u and the input signal e, the input signal e being preferably equal to the difference between the signal y captured by the microphone and the estimation $\hat{x}$;
  the method 100 being characterized in that the adaptation 103 of the filter A being carried out directly by an update of the Fourier transform based on the same partition as that determined in the determination step 101, and used in the application step 102 of the filter A.

The adaptive method thus involves two main components:

The component or filter A filters the signal u(n) by applying a fast convolution algorithm with non-uniform partitioning of the impulse response.

The component or adapter B updates the estimation of the transfer function of the acoustic feedback from the signals u(n) and e(n), and transmits it to A.

Figure 3:
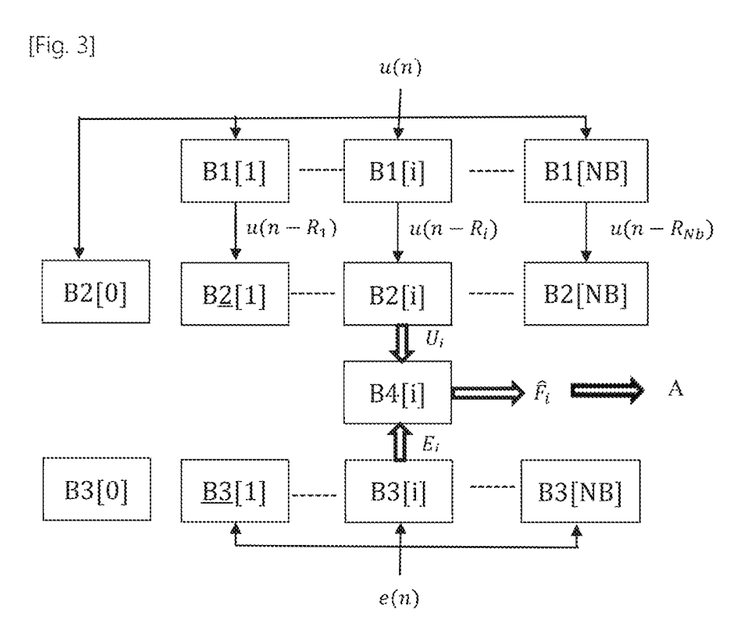
FIG. 3 is a representation of the main components configured for implementing the different steps of updating the adapted filter according to one implementation of the method according to the disclosure.

The adapter B can for example comprise the following components, created according to one implementation, during the determination step 101, which comprises for example the following steps, described with reference to FIGS. 3 and 4, of:
  ET1: creating a plurality of FIFO buffers $B1(1), \ldots, B1(i), \ldots, B1(Nb)$, each FIFO buffer, $B1(1), \ldots, B1(i), \ldots, B1(Nb)$, being associated with a block $b_1, \ldots b_i, \ldots, b_{Nb}$ of the partition, and having a depth $R_1, R_2, \ldots, R_i, \ldots R_{Nb}$ equal to the size of said block of the partition, the depth $R_1, R_2, \ldots, R_i, \ldots R_{Nb}$ defining a number of samples u(n) of the output signal u which may be backed up in said FIFO buffer;
  ET2: creating a plurality of components $B2(0), B2(1), \ldots, B2(i), \ldots, B2(Nb)$, the plurality of components $B2(0), B2(1), \ldots, B2(i), \ldots, B2(Nb)$ comprising a non-delayed component B2(0) associated with a non-delayed block of the partition, and at least one delayed component B2(1), ..., B2(i), ..., B2(Nb), the at least one delayed component B2(1), ..., B2(i), ..., B2(Nb) being associated with a FIFO buffer and with the block of the partition associated with said FIFO buffer; the non-delayed component B2(0) comprises for example a first non-delayed buffer $u_0$, and a second non-delayed buffer $v_0$; the at least one delayed component B2(1), ..., B2(i), ..., B2(Nb) comprises for example a first delayed buffer $u_1, ..., u_i, ..., u_{Nb}$, and a second delayed buffer $v_1, ..., v_i, ..., v_{Nb}$; the first buffer and the second buffer of each component being respectively configured to receive a number of samples $M_0, M_1, M_2, ... M_i, ... M_{Nb}$ equal to the size of a sub-block of the block associated with said component;

ET3: creating a plurality of source buffers B3(0), B3(1), ..., B3(i), ..., B3(Nb), each source buffer being associated with a block of the partition and having a size $M_0, M_1, M_2, ... M_i, ... M_{Nb}$ equal to the size of a sub-block of the block associated with said source buffer;

According to one implementation, the steps of adapting 103 the filter A by the adapter B are described in detail below with reference to FIGS. 3 and 4:

ET21: at each instant n, backing up the corresponding sample u(n) of the output signal u in the first non-delayed buffer $u_0$ of the non-delayed component B2(0), until the first non-delayed buffer $u_0$ is full;

ET22: in each FIFO buffer B1(1), ..., B1(i), ..., B1(Nb) of the first plurality of buffers, and for each instant n, backing up the samples u(n) of the output signal u, until said buffer is full, with at least one last sample u(n) backed up in said buffer and the delayed sample u(n-Ri) backed up first in said buffer;

ET23: for each delayed component of the plurality of components B2(1), ..., B2(i), ..., B2(Nb), at each instant n following the instant when the FIFO buffer associated with said delayed component is full, backing up the delayed sample u(n-Ri) of said FIFO buffer in the first delayed buffer $u_1, ..., u_i, ..., u_{Nb}$ of said delayed component B2(1), ..., B2(i), ..., B2(Nb), until said first delayed buffer $u_1, ..., u_i, ..., u_{Nb}$ is full;

ET24: for each component of the plurality of components B2(0), B2(1), ..., B2(i), ..., B2(Nb):

ET24a: when the first buffer $u_0, u_1, ..., u_i, ..., u_{Nb}$ is full, if the second buffer $v_1, ..., v_i, ..., v_{Nb}$ of said component is empty, copying said first buffer $u_0, u_1, ..., u_i, ..., u_{Nb}$ in the second buffer $v_1, ..., v_i, ..., v_{Nb}$ of said component, and repeating the steps ET1, ET2, ET3, ET4 until the first buffer $u_0, u_1, ..., u_i, ..., u_{Nb}$ is full again;

ET24b: if the second buffer $v_1, ..., v_i, ..., v_{Nb}$ of said component is not empty, forming a third buffer $w_0, w_1, ..., w_i, ..., w_{Nb}$ by concatenating the first and second buffers of said component B2(0), B2(1), ..., B2(i), ..., B2(Nb), so that $w_i = [v_i\ u_i]$;

ET24c: calculating a Fourier transform $S_0, S_1, ..., S_i, ... S_{Nb}$ of the contents of the third buffer $w_0, w_1, ..., w_i, ..., w_{Nb}$;

ET24d: inserting the Fourier transform $S_i$ in the first place of a ring buffer $U_i$ configured to contain a history of the Fourier transforms $S_0, S_1, ..., S_i, ... S_{Nb}$ calculated in step E24c during the $N_i$ last iterations of step E24, for a number of iterations $N_i$ determined according to the number of sub-blocks of the block associated with the component B2(0), B2(1), ..., B2(i), ..., B2(Nb);

ET31: for each source buffer of the plurality of source buffers B3(0), B3(1), ..., B3(i), ..., B3(Nb), at each instant n, backing up the corresponding sample e(n) of the input signal e in said source buffer B3(0), B3(1), ..., B3(i), ..., B3(Nb), until said source buffer B3(0), B3(1), ..., B3(i), ..., B3(Nb) is full;

ET32: for each source buffer of the plurality of source buffers B3(0), B3(1), ..., B3(i), ..., B3(Nb), creating a concatenated source buffer by concatenating virtual source samples having the same virtual source sample value with said source buffer B3(0), B3(1), ..., B3(i), ..., B3(Nb), so that a size of the concatenated source buffer is equal to twice the size of said source buffer B3(0), B3(1), ..., B3(i), ..., B3(Nb); preferably, the value of at least one virtual source sample is comprised between −0.5 and 0.5, preferably equal to 0; preferably the value of all the virtual source samples is equal to 0;

ET33: for each source buffer of the plurality of source buffers (B3(0), B3(1), ..., B3(i), ..., B3(Nb), calculating a Fourier transform $E_0, E_1, ... E_i, ... E_{Nb}$ of the concatenated source buffer created for said source buffer B3(0), B3(1), ..., B3(i), ..., B3(Nb);

ET4: updating the Fourier transform $F_{1,i}, F_{2,i}, ... F_{j,i}, ... F_{Ni,i}$ of each sub-block $h_{1,i}, h_{2,i}, ... h_{j,i}, ... h_{Ni,i}$, of each block $b_1, ... b_i, ..., b_{Nb}$ of the impulse response RI from the ring buffer obtained in step ET24d and from the Fourier transform $E_0, E_1, ... E_i, ... E_{Nb}$ obtained in step ET33.

According to one implementation, the step ET4 of updating the Fourier transform of each sub-block of each block of the impulse response from the first ring buffer obtained in step ET2 and from the buffer obtained in step ET33, is carried out by applying an adaptive method in the frequency domain.

This operation is performed every $M_i$ samples, when the data blocks $U_i$ and $E_i$ respectively from the components B2[i] and B3[i] are full. The adaptation can for example be performed by the Fast Block LMS algorithm:

Loop on j=1 to $N_i$:

Calculation of the product of the conjugate of $E_i$ and the $j^{th}$ element $U_{ji}$ of $U_i$ Calculation of the inverse FFT, zero setting of the $M_i$ last elements, calculation of the FFT Multiplication by $2\mu_i$ (step size). The result is denoted $\Delta F_{ji}$ Addition of $\Delta F_{ji}$ to the $j^{th}$ element of $F_i$: $F_{ji} + \Delta F_{ji} \rightarrow F_{ji}$ Other more advanced adaptive algorithms can be applied (for example NLMS, with or without regularization).

The principle consisting in using different block sizes, common to the convolution and the adaptation, supposes choosing adaptation parameter sets, including in particular the parameter $\mu_i$, specific to each size $M_i$ while ensuring the consistency of the estimation.

Several steps can be followed in choosing these parameter sets; it is possible to obtain a different convergence speed at the beginning and the end of the response, which can be favourable in practice.

The suggested acoustic feedback control algorithm is thus of the PBFDAF type, i.e. according to the Anglo-Saxon terminology "Partitioned Block Frequency Domain Adaptive Filter". However, unlike existing methods, its particularity is to perform the convolution and adaptation processing operations with the same non-uniform partition of the impulse response of the acoustic feedback. The use of a non-uniform partition allows significantly reducing the complexity compared to existing PBFDAF algorithms, with equivalent latency and filter order. Unlike an UN-PBDAF-type algorithm, in which only the convolution is performed on a non-uniform partitioning, adopting the same partitioning for the convolution and the adaptation makes it possible to avoid having to explicitly calculate the impulse response in the time domain, which reduces complexity.

According to another aspect, the disclosure concerns a computer program comprising a set of instructions executable by a computer processor, the set of instructions being configured to implement the steps of the method according to any one of the preceding claims when the set of instructions is executed by the computer processor.

According to yet another aspect, the disclosure concerns a computer-readable medium, comprising a set of instructions executable by a computer processor, the set of instructions being configured to implement the steps of the method according to any one of the implementations described above, when the set of instructions is executed by the computer processor.

The invention claimed is:

1. An acoustic feedback control adaptive method in an output signal (u) of a sound broadcasting device (S), the sound broadcasting device (S) receiving as input an input signal (e), the input signal (e) being a function of a signal (y) captured by a microphone and an estimation ($\hat{x}$) of an acoustic feedback signal (x), the captured signal (y) being equal to the sum of an acoustic source signal (s) and the acoustic feedback signal (x), the estimation $\hat{x}$ of the acoustic feedback signal (x) the method including the following steps:
   determining a filter (A), an impulse response (RI) of the filter (A) being partitioned into a partition comprising a plurality of blocks ($b_0, \ldots b_i, \ldots, b_{Nb}$) in the time domain, each block ($b_0, \ldots b_i, \ldots, b_{Nb}$) of the plurality comprising a number of samples of the impulse response, said number of samples being equal to a size of said block, each block of the plurality of blocks (bi) comprising a number (Ni) of sub-blocks ($h_{1,i}, h_{2,i}, \ldots h_{j,i}, \ldots h_{Ni,i}$), the number (Ni) of sub-blocks ($h_{1,i}, h_{2,i}, \ldots h_{j,i}, \ldots h_{Ni,i}$) being greater than or equal to one, the determination step further comprising the following steps of:
   for each sub-block ($h_{1,i}, h_{2,i}, \ldots h_{j,i}, \ldots h_{Ni,i}$) of each block of the impulse response (RI), calculating a frequency transform ($F_{1,i}, F_{2,i}, \ldots F_{j,i}, \ldots F_{Ni,i}$) from said sub-block ($h_{1,i}, h_{2,i}, \ldots h_{j,i}, \ldots h_{Ni,i}$);
   repeating the following steps of:
   applying the filter (A) to the output signal (u) using the frequency transform ($F_{1,i}, F_{2,i}, \ldots F_{j,i}, \ldots F_{Ni,i}$) of each sub-block ($h_{1,i}, h_{2,i}, \ldots h_{j,i}, \ldots h_{Ni,i}$) of each block of the impulse response (RI), to obtain the estimation ($\hat{x}$) of the acoustic feedback signal (x);
   adapting the filter (A), by updating the frequency transform ($F_{1,i}, F_{2,i}, \ldots F_{j,i}, \ldots F_{Ni,i}$) of each sub-block ($h_{1,i}, h_{2,i}, \ldots h_{j,i}, \ldots h_{Ni,i}$) of each block of the impulse response (RI) as a function of the output signal (u) and the input signal (e),
   wherein:
   the adaptation of the filter (A) is carried out by an update of the frequency transform calculated and adapted based on the same partition as that determined in the determination step and used in the step of applying the filter (A).

2. The method according to claim 1, wherein the size of a block ($b_0, \ldots b_i, \ldots, b_{Nb}$) is different from another size of at least one other block ($b_0, \ldots b_i, \ldots, b_{Nb}$).

3. The method according to claim 1, wherein each sub-block ($h_{1,i}, h_{2,i}, \ldots h_{j,i}, \ldots h_{Ni,i}$) of said block has the same size (Mi) as the other sub-blocks of said block, so that the size of a block (bi) is equal to (Ni*Mi).

4. The method according to claim 1, wherein the calculation of the frequency transform of a sub-block ($h_{1,i}, h_{2,i}, \ldots h_{j,i}, \ldots h_{Ni,i}$) of a block of the impulse response (RI) includes the following steps: creating a concatenated sub-block by concatenating said sub-block ($h_{1,i}, h_{2,i}, \ldots h_{j,i}, \ldots h_{Ni,i}$) with virtual samples, such that a size of the concatenated sub-block is equal to at least twice the size of said sub-block; and calculating the frequency transform ($F_{1,i}, F_{2,i}, \ldots F_{j,i}, \ldots F_{Ni,i}$) of the concatenated sub-block created for said sub-block ($h_{1,i}, h_{2,i}, \ldots h_{j,i}, \ldots h_{Ni,i}$).

5. The method according to claim 1, wherein the output signal (u), the input signal (e), respectively comprise a plurality of samples (u(n)), (e(n)) in the time domain, each sample of said plurality (u(n)), respectively (e(n)), corresponding to one value, at successive instants (n), of the output signal (u), respectively of the input signal (e), and wherein the determination step further includes the following steps:
   (ET2) creating a plurality of components (B2(0), B2(1), ..., B2(i), ..., B2(Nb)), the plurality of components (B2(0), B2(1), ..., B2(i), ..., B2(Nb)) comprising a non-delayed component (B2(0)) associated with a non-delayed block of the partition, and at least one delayed component (B2(1), ..., B2(i), ..., B2(Nb)), the non-delayed component (B2(0)) comprising a non-delayed output buffer ($w_0$), the at least one delayed component (B2(1), ..., B2(i), ..., B2(Nb)) comprising a delayed output buffer ($w_1, \ldots, w_i, \ldots, w_{Nb}$);
   (ET3) creating a plurality of source buffers (B3(0), B3(1), ..., B3(i), ..., B3(Nb)), each source buffer being associated with a block of the partition;
   and wherein the adaptation step comprises the following steps of:
   (ET24c) calculating a frequency transform ($S_0, S_1, \ldots, S_i, \ldots S_{Nb}$) of the output buffer contents ($w_0, w_1, \ldots, w_i, \ldots, w_{Nb}$);
   (ET24d) inserting the frequency transform $S_i$ in a ring buffer ($U_i$) configured to contain a history of the frequency transforms ($U_{0,1}, U_{2,i}, \ldots, U_{j,i}, \ldots, U_{Ni,i}$) calculated in step (E24c) during the Ni last iterations of step (E24c), for a number of iterations (Ni) determined according to the number of sub-blocks of the block associated with the component (B2(0), B2(1), ..., B2(i), ..., B2(Nb));
   (ET33) for each source buffer of the plurality of source buffers (B3(0), B3(1), ..., B3(i) ..., B3(Nb)), calculating a frequency transform ($E_0, E_1, \ldots, E_i, \ldots E_{Nb}$) from said source buffer (B3(0), B3(1), ..., B3(i), ..., B3(Nb));
   (ET4) updating the frequency transform ($F_{1,i}, F_{2,i}, \ldots F_{j,i}, \ldots F_{Ni,i}$) of each sub-block ($h_{1,i}, h_{2,i}, \ldots h_{j,i}, \ldots h_{Ni,i}$) of each block ($b_1, \ldots b_i, \ldots, b_{Nb}$) of the impulse response (RI) from the ring buffer, obtained in step (ET2), and from the frequency transform ($E_0, E_1, \ldots, E_i, \ldots E_{Nb}$) calculated from the source buffers in step (ET33).

6. The method according to claim 5, wherein the non-delayed component (B2(0)) comprises a first non-delayed buffer ($u_0$) and a second non-delayed buffer ($v_0$), the at least one delayed component (B2(1), ..., B2(i), ..., B2(Nb)) comprising a first delayed buffer ($u_1, \ldots, u_i, \ldots, u_{Nb}$), and a second delayed buffer ($v_1, \ldots, v_i, \ldots, v_{Nb}$), and wherein the method includes the following steps: (ET1) creating a plurality of FIFO buffers ($B1(1), \ldots, B1(i), \ldots, B1(Nb)$), each FIFO buffer ($B1(1), \ldots, B1(i), \ldots, B1(Nb)$) being associated with a block ($b_1, \ldots b_i, \ldots, b_{Nb}$) of the partition, and having a depth ($R_1, R_2, \ldots, R_i, \ldots R_{Nb}$) equal to the size of said block of the partition, the depth ($R_1, R_2, \ldots, R_i, \ldots R_{Nb}$) defining a number of samples ($u(n)$) of the output signal (u) which may be backed up in said FIFO buffer, the at least one delayed component ($B2(1), \ldots, B2(i), \ldots, B2(Nb)$) being associated with a FIFO buffer and with the partition block associated with said FIFO buffer; and wherein the adaptation step comprises the following steps, carried out before step (ET24c), of: (ET21) at each instant (n), backing up the corresponding sample ($u(n)$) of the output signal (u) in the first non-delayed buffer ($u_0$) of the non-delayed component ($B2(0)$), until the first non-delayed buffer ($u_0$) is full; (ET22) in each FIFO buffer ($B1(1), \ldots, B1(i), \ldots, B1(Nb)$) of the first plurality of FIFO buffers, and for each instant (n), backing up the samples ($u(n)$) of the output signal (u), until said buffer is full, with at least one last sample ($u(n)$) backed up in said buffer and the delayed sample ($u(n-Ri)$) backed up first in said buffer; (ET23) for each delayed component of the plurality of components ($B2(1), \ldots, B2(i), \ldots, B2(Nb)$), at each instant (n) following the instant when the FIFO buffer associated with said delayed component is full, backing up the delayed sample ($u(n-Ri)$) of said FIFO buffer in the first delayed buffer ($u_1, \ldots, u_i, \ldots, u_{Nb}$) of said delayed component ($B2(1), \ldots, B2(i), \ldots, B2(Nb)$), until said first delayed buffer ($u_1, \ldots, u_i, \ldots, u_{Nb}$) is full; (ET24) for each component of the plurality of components ($B2(0), B2(1), \ldots, B2(i), \ldots, B2(Nb)$): (ET24a) when the first buffer ($u_0, u_1, \ldots, u_i, \ldots, u_{Nb}$) is full, if the second buffer ($v_1, \ldots, v_i, \ldots, v_{Nb}$) of said component is empty, copying said first buffer ($u_0, u_1, \ldots, u_i, \ldots, u_{Nb}$) in the second buffer ($v_1, \ldots, v_i, \ldots, v_{Nb}$) of said component, and repeating the steps (ET1), (ET2), (ET3), (ET4) until the first buffer ($u_0, u_1, \ldots, u_i, \ldots, u_{Nb}$) is full again; (ET24b) if the second buffer ($v_1, \ldots, v_i, \ldots, v_{Nb}$) of said component is not empty, forming the output buffer ($w_0, w_1, \ldots, w_i, \ldots, w_{Nb}$) by concatenating the first and second buffers of said component ($B2(0), B2(1), \ldots, B2(i), \ldots, B2(Nb)$) so that $wi = [vi\ ui]$.

7. The method according to claim 5, wherein the adaptation step further includes the following steps:
(ET31) for each source buffer of the plurality of source buffers ($B3(0), B3(1), \ldots, B3(i), \ldots, B3(Nb)$), at each instant (n), backing up the corresponding sample $e(n)$ of the input signal (e) in said source buffer ($B3(0), B3(1), \ldots, B3(i), \ldots, B3(Nb)$), until said source buffer ($B3(0), B3(1), \ldots, B3(i), \ldots, B3(Nb)$) is full;
(ET32) for each source buffer of the plurality of source buffers ($B3(0), B3(1), \ldots, B3(i), \ldots, B3(Nb)$), creating a concatenated source buffer by concatenating virtual source samples having the same virtual source sample value with said source buffer ($B3(0), B3(1), \ldots, B3(i), \ldots, B3(Nb)$), so that a size of the concatenated source buffer is equal to twice the size of said source buffer ($B3(0), B3(1), \ldots, B3(i), \ldots, B3(Nb)$);
and wherein the calculation (ET33) of a frequency transform ($E_0, E_1, \ldots, E_i, \ldots E_{Nb}$) from said source buffer ($B3(0), B3(1), \ldots, B3(i), \ldots, B3(Nb)$) is carried out from the concatenated source buffer created for each source buffer of the plurality of source buffers ($B3(0), B3(1), \ldots, B3(i), \ldots, B3(Nb)$).

8. The method according to claim 1, wherein the frequency transform is a Fourier transform.

9. A non-transitory computer readable storage medium storing a program comprising a set of instructions executable by a computer processor, the set of instructions being configured to implement the steps of the method according to claim 1 when the set of instructions is executed by the computer processor.

10. A non-transitory computer-readable storage medium storing a program, the computer program comprising a set of instructions executable by a computer processor, the set of instructions being configured to implement the steps of the method according to claim 1, when the set of instructions is executed by the computer processor.

* * * * *